United States Patent [19]

Kelly

[11] 3,744,245
[45] July 10, 1973

[54] CLOSED CYCLE ROTARY ENGINE SYSTEM
[76] Inventor: Donald A. Kelly, 58-06 69th Place, Maspeth, N.Y. 11378
[22] Filed: June 21, 1971
[21] Appl. No.: 154,759

[52] U.S. Cl. .......................................... 60/95, 60/36
[51] Int. Cl. ....................... F01k 25/00, F01k 19/10
[58] Field of Search ...................... 60/24, 25, 95, 36

[56] References Cited
UNITED STATES PATENTS
3,537,269  11/1970  Kelly ................................... 60/24 X
3,657,877  4/1972  Huffman ................................ 60/25

Primary Examiner—Martin P. Schwadron
Assistant Examiner—Allen M. Ostrager

[57] ABSTRACT

The closed cycle rotary engine system consists of a rotary expander stage and rotary pump stage, which are driven together at a 1 to 1.+ ratio.

The fluid/vapor closed loop is formed to enter and leave the two rotary stages tangentially so that a minimum number of simplified rotary components are required.

Multiple boiler coils are located above and around the two rotary stages to heat an organic fluid working medium which expands in a vapor state to drive the expander stage rotor.

Multiple condenser coils are located below and in front of the two rotary stages which cools the vapor to a liquid state which is then drawn into the rotary pump stage for further cooling and transfer.

Supplementary heating and cooling techniques are adopted to enable a reduction in the total size and volume of the rotary engine system.

6 Claims, 4 Drawing Figures

3,744,245

INVENTOR
Donald A. Kelly

3,744,245

INVENTOR
Donald A. Kelly

CLOSED CYCLE ROTARY ENGINE SYSTEM

BACKGROUND OF THE INVENTION

The present invention has been evolved from a recognition of the numerous superior features of the organic fluid/vapor closed cycle engine.

Several organic fluid type engines and turbines are now operational with the potential for steady improvements increasingly evident. Among the distinct advantages of the organic fluid/vapor systems are:
 a. Evaporation of the working fluid at relatively low temperatures, so that nitrogen oxides emission levels are kept low.
 b. No danger of the freezing of the working medium.
 c. Possible elimination of conventional gear or automatic transmissions.
 d. Quiet, vibration-free operation, with no oil changes and tuneups.
 e. Operation on any convenient low-emission fuel.
 f. Long, trouble-free engine operating life due to a minimum number of simple working parts.

There has been a noticeable trend within the domestic automobile industry to refer to the steam engine when judging the relative merits of the newer organic fluid/vapor cycle prime mover systems.

Considerable difference now exists between the classic steamers, and the more advanced vapor cycle systems, which now exhibit considerable future potential, unlike their predecessors. Several industry sources tend to critize the excessive size of both boiler and condenser components of vapor cycle machines without regard to several promising ongoing techniques which will reduce the size and/or form of these components.

It must be apparent to even the most casual observer that the domestic auto industry is in an extremely poor position to judge the relative merits of any prime mover system when it is noted that not one classic engine cycle ever originated in the U.S. The tendency to "negative pre-judgement" reflects this poor past innovative history, so that basic improvements are best left to competent independent developers.

The choice and capacity of the working components in organic vapor cycle technology is limited by the characteristics of the Rankine cycle and the organic fluid selected, for a given engine system rating.

The choice of expanders is generally limited to piston engines, turbines, helical units and rotary vane units. It is now generally believed that the positive-displacement expanders represented by pistons, helical and rotary units present the best possible choice as expander stages, since they operate at lower speeds which can eliminate a transmission and increase the working life of component parts.

This present invention advocates the use of the rotary-vaned type of expander, since manufacturing and replacement costs can be kept low, and servicing procedures simplified.

The design of the various components such as the boiler coils, condensers, expander/pump, regenerator and auxiliaries must be determined by the convenient space available within the vehicle, with optimum placement of each for efficiency and ease of assembly and repalcement.

SUMMARY OF THE INVENTION

This invention relates to a closed Rankine cycle rotary engine system in which the rotary engine expander stage and rotary pump are parallel and shaft connected together, through a bevel and mitre gear arrangement, set at a 1 to 1.+ speed ratio.

The expander stage and rotary pump housings are generally squarish, symmetrical, and rigidly connected together with a lightweight structural member. The squarishness and symmetry of the two stage housings will optimize the strength to -weight ratio of these two components.

Like most current systems, the expander stage regenerator or economizer will be indirectly heated from the burners, but unlike these systems, the rotary pump stage housing will be directly cooled, to achieve a greater delta T potential between these two stages.

Multiple boiler coils, of any determined diameter, are formed of seamless alloy steel and located above and around the two rotary stages. One end of the entrance vapor boiler coil is connected to the expander top tangential bores, while the other end of the exit fluid boiler coil is connected to the rotary pump top tangential bores.

Multiple condenser coils, of any determined diameter, are also formed of seamless alloy steel and located below and in front of the two rotary stages. One end of the entrance fluid condenser coil is connected to the rotary pump side tangential bore, while the other end of the exit vapor condenser coil is connected to the expander side tangential bores.

The circuit through the joined boiler coils to the expander stage, then through the joined condenser coils and then to the rotary pump, is a fully closed loop so that effecive external heating and cooling are required.

The basic heating arrangement is comprised of multiple conventional fuel burners centrally located within each coil boiler, which uniformly heats the coils by radiation, and is established in the art.

The supplementary heating technique consists of heating the entering vapor by means of a regenerator-economizer which recovers heat from most of the adjacent burners and is also established in the art.

The basic cooling arrangement consists of ambient incoming air flow directly over the two main condensers, along with cooling air flow from multiple air temperature splitters directed over all of the condenser coils, which is new to the art.

The supplementary cooling technique consists of directly cooling the rotary pump housing with "heat pipes" connected to a liquid coolant system, or by a directly contacting coolant jacket, which is also new to the art.

It is believed that the combination of both basic with supplementary heating and cooling arrangements will result in a large reduction of the total system size and volume, making it more compatible with existing automobile configurations.

The two rotating stages, expander and pump, may also be axially connected by a common drive shaft, which would be suitable for certain applications. In the axial design the rotary pump would have a slightly larger diameter than the expander stage, so that a slight differential pressure is established between the two rotating stages. This arrangement relieve possible back pressure on the expander exit ports and increases pressure through the series boiler coils slightly.

The different speeds of the two rotors in the parallel stage arrangement, previously described, accomplishes the same purpose, and should enhance the operating effectiveness of the total system. It must be noted that the speed ratio must be quite small so that the expander rotor is not over loaded and output torque reduced.

This present invention does not attempt to define the specific organic fluid to be used, which is beyond its intended scope. The various organic fluids currently used such as freon and variations thereof, thiophene, or other fluid will prove effective in use, but with the addition of a compatible lubricant to uniformly lubricate and partially seal the working components when cycling through the system.

It is a principal object of this invention to provide a low-cost, effective closed cycle power system for vehicles, and other applications, at minimum exhaust emission levels.

Another object of the invention is to achieve an improved external combustion engine system which is readily adaptable to present vehicular design.

A further object of the invention is to provide an improved expander stage and "cold" rotary pump relationship relieves eelieves back pressure on the expander and hastens complete condensation, for component size reduction.

A final object of the invention is to achieve a generally improved and compact closed cycle power system which requires a minimum of maintenance with long, trouble-free life.

The above objects of the invention will become apparent from the following description when taken in conjunction with the accompanying drawings, which illustrate the preferred embodiment thereof.

It should be understood that variations and additions may be made in the detail design of the power system, without departing from the spirit and scope of the invention.

DESCRIPTION OF THE PREFERRED EMBODIMENT

Figure 1:
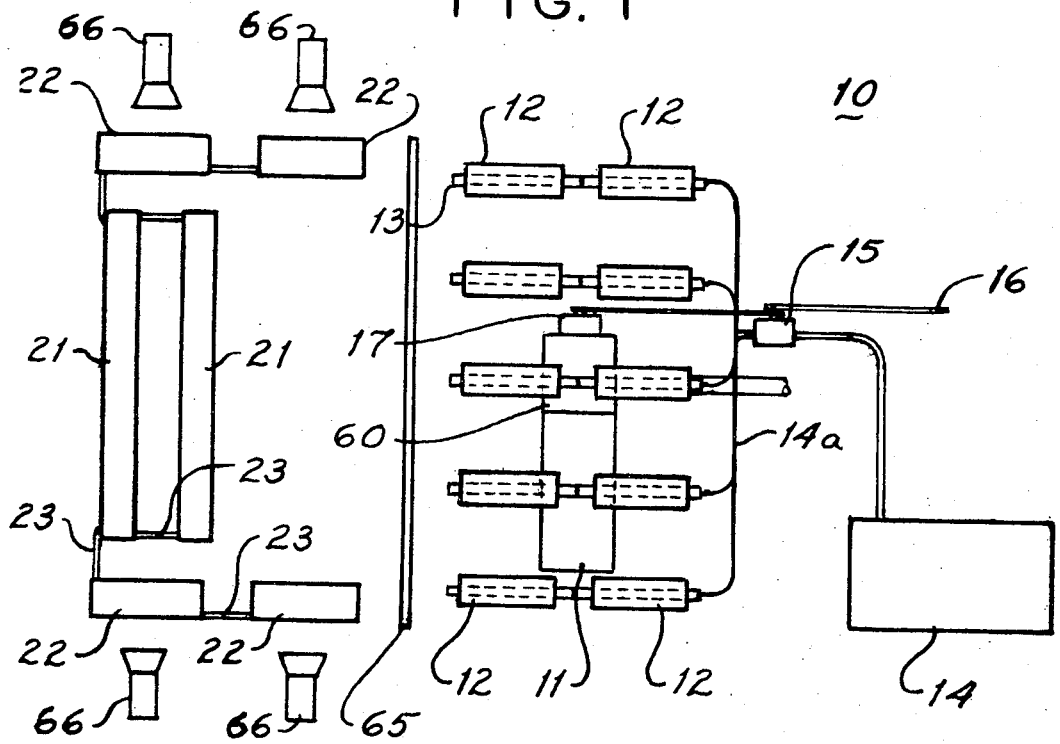
FIG. 1 is a plan schematic of the closed cycle engine system.
Figure 2:
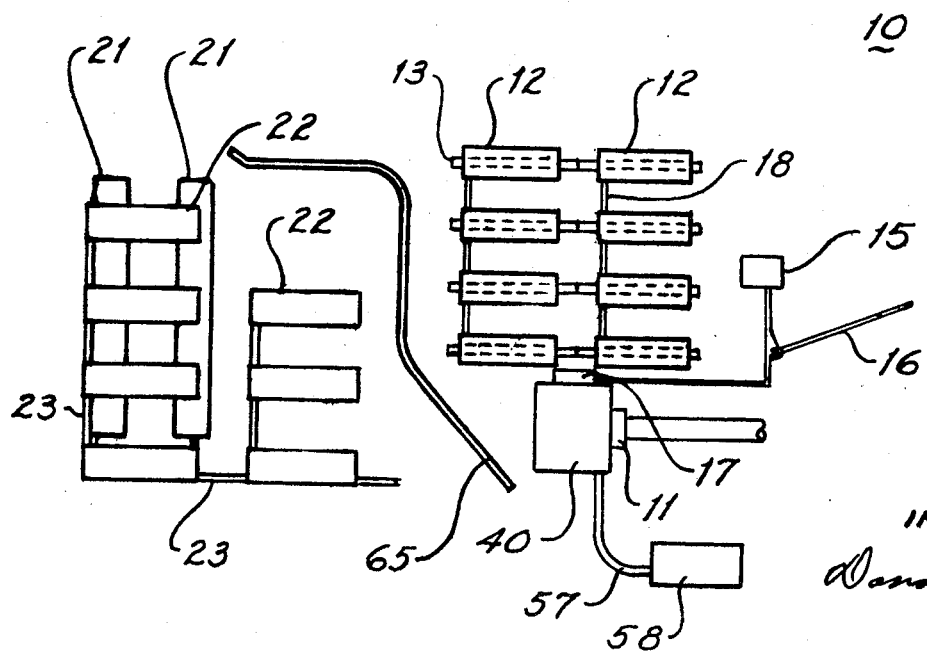
FIG. 2 is an elevation schematic of the closed cycle engine system.
Figure 3:
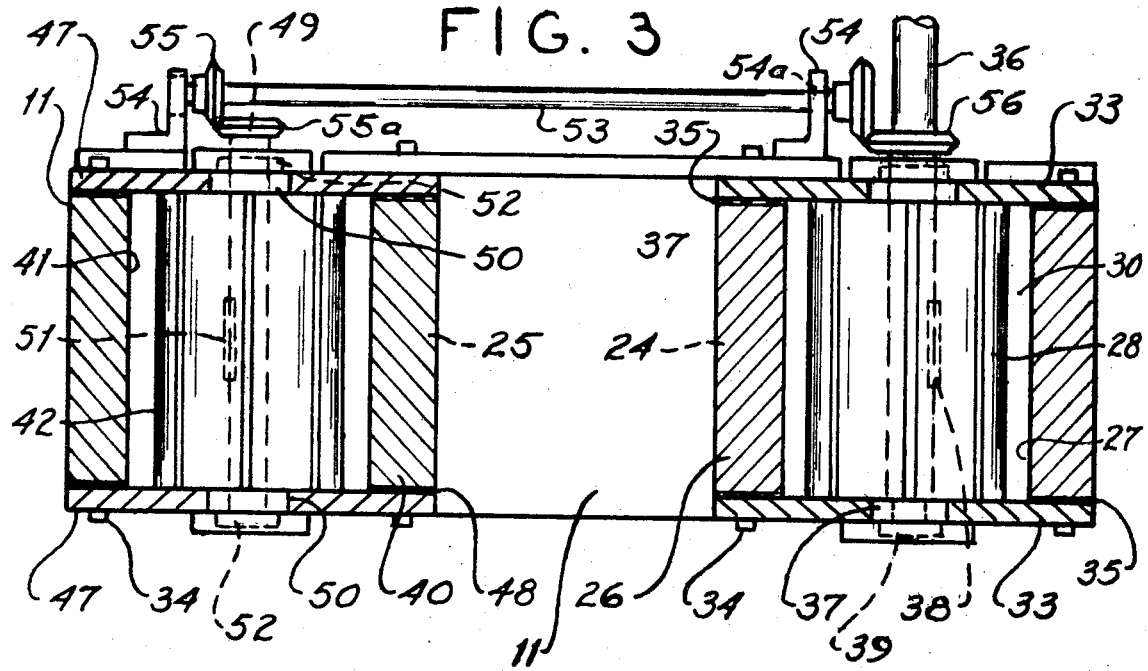
FIG. 3 is a plan view of the rotary expander stage/rotary pump stage assembly.
Figure 4:
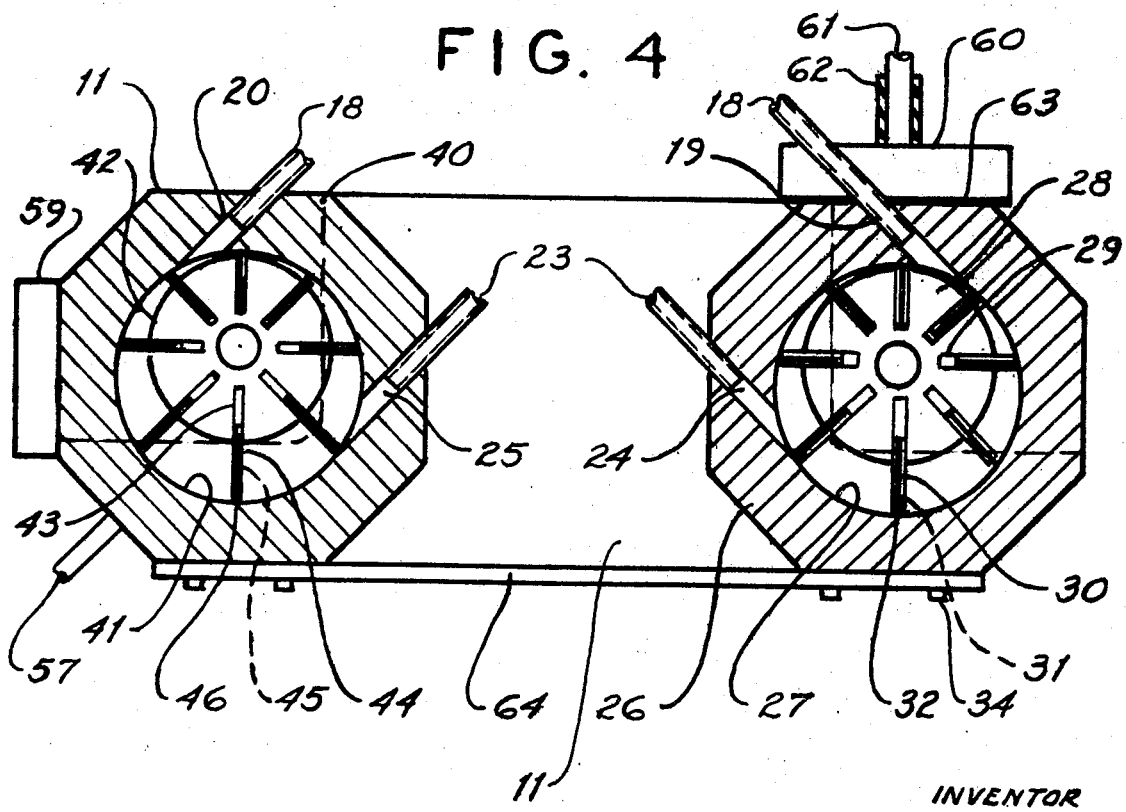
FIG. 4 is an elevation view of the rotary expander stage/rotary pump stage assembly

In the drawings numeral 10 indicates a preferred embodiment of the closed cycle engine system, which is comprised of various known and new components as illustrated in the figures of the drawings. The closed Rankine cycle system includes the rotary expander/pump stage assembly 11, multiple coil boilers 12, in which the elongate fuel burners 13, are centrally positioned and supplied with fuel from the fuel storage tank 14, by way of the fuel lines 14a.

A conveniently located burner control unit 15, is provided to control the heat level of all burners simultaneously and is varied thru the linkage 16, to the throttle valve 17.

Identical connection pipes 18, join each of the multiple coil boilers 12, together and connect all the coil burners 12, to the expander vapor ports 19, and rotary pump liquid ports 20, in a series flow loop.

Two main condensers 21, and multiple condenser coils 22, are joined together by identical connection pipes 23, which also connect all the condensing units, 21 and 22, to the expander vapor ports 24, and rotary pump liquid ports 25, in a series flow loop.

The rotary expander/pump stage assembly 11, is comprised of a symmetrically squarish expander housing 26, containing a large central bore 27. An eccentrically placed expander rotor 28, has uniformly sized and spaced radial slots 29, in which uniform and closely fitting vanes 30, slide. The vanes 30, contain three uniform slots 31, cut around three adjacent sides, into which the sealing elements 32, closely fit. Two end plates 33, are secured to the two faces of the expander housing 26, with the screws 34. Gaskets 35, are provided between the expander housing 26, and the two end plates 33. A drive shaft 36, supported by two bearings 37, fitted within the two end plates 33, is secured to the expander rotor 28, by means of the key 38. Two shaft seals 39, prevent vapor leakage in the proximity of the drive shaft 36.

The tangential expander ports 19, and 24, are disposed approximately 180° apart, for optimum utilization of the vapor expansive energy, and are therefore nearly parallel, at a relative angle near 45 degrees.

The symmetrically squarish pump housing 40, comprises the transfer stage of the rotary expander/pump stage assembly 11, and contains the large central bore 41. An eccentrically placed pump rotor 42, has uniformly sized and spaced radial slots 43, in which the uniform and closely fitting vanes 44, slide. The vanes 44, contain three uniform slots 45, cut around three adjacent sides, into which sealing elements 46, closely fit. Two end plates 47, are secured to the two faces of the pump housing 40, with the screws 34. Gaskets 48, are provided between the pump housing 40, and the two end plates 47. A drive shaft 49, supported by two bearings 50, fitted within the two end plates 47, is secured to the pump rotor 42, by means of the key 51. The two shaft seals prevent fluid leakage in the proximity of drive shaft 49.

The tangential pump ports 20, and 25, are disposed approximately 180° apart for optimum transfer of the condensed fluid medium, and are therefore nearly parallel, at a relative angle near 45°.

An external connecting shaft 53, joins the drive shaft 36, and 49, together through a bevel gear set 55, and mitre gear set 56. The bevel gear set 55, is arranged so that the smaller bevel gear 55a, is fitted to the pump shaft 49, in order that its relative speed is greater than that of the connecting shaft 53. The speed ratio selected may range between 1 to 1.1 and 1 to 1.5, so that back pressure on the expander stage is relieved to suit the specifics of the total rotary engine system rating. Bearing brackets 54, and bearings 54a, support the connecting shaft 53, between the housings 26 and 40.

In addition to conventional incoming air cooling over the two main condensers 21, multiple air temperature splitters 66, will be provided as a cooling means, to reduce the total size and volume of the condensing arrangement required. The air temperature splitters 66, are known in heat transfer art and are therefore schematically illustrated as part of the system 10. The rotating drive means for the air splitters 66, may be from any convenient source.

The supplementary cooling means consists of directly cooling the rotary pump housing 40, with heat pipes 57, connected to an external circulating liquid cooling arrangement 58, or by a liquid coolant jacket 59 in direct contact with the pump housing 40.

The supplementary heating arrangement consists of a regenerator/economizer 60, which provides additional heat eneggy to the vapor entering the expander housing 26. The regenerator/economizer 60, receives heat flow from the adjacent fuel burners 13, by way of multiple heat pipes 61, which are insulated by the fiberglass sleeves 62. The regenerator/economizer is mounted to the expander housing 26, but insulated from it by the insulator 63, so that the expander housing 26, is not subject to local thermal distortion.

A lightweight support frame 64, joins and aligns the expander housing 26, to the pump housing 40, to form the complete rotary expander/pump stage assembly 11. The screws 34, secure the two housings 26 and 40 to the support frame 64.

A large, shaped insulation member 65, is formed between the boiler coils 12, and the condenser coils 22, to avoid system thermal loses.

What is claimed is:

1. A closed cycle rotary engine system containing a sealed circulating organic fluid working medium, a rotary expander stage and rotary pump stage assembly driven together by a common drive shaft with gearing multiple rotor and vane elements eccentrically located within said rotary expander stage and rotary pump stage assembly, multiple tangential ports disposed within said rotary expander stage and rotary pump stage assembly, multiple boiler coils disposed above and around the said rotary expander stage and rotary pump stage assembly, pipe connection means between said multiple boiler coils forming a vapor circuit with said multiple tangential ports disposed within said rotary expander stage and rotary pump stage assembly, elongate fuel burners centrally disposed within said multiple boiler coils, a fuel supply and delivery means to each of said elongate fuel burners, central control means for all of said fuel burners, multiple condenser coils disposed below and in front of said rotary expander stage and rotary pump stage assembly, pipe connection means between said multiple condenser coils forming a fluid circuit with said multiple tangential ports disposed within said rotary expander stage and rotary pump stage assembly, thermal regeneration means in heat transfer communication with the said burners for providing auxiliary heat energy to the vapor entering the expander housing, a cooling means comprised of multiple air temperature splitters in close association with the said multiple condenser coils, a supplementary cooling means comprised of a liquid coolant jacket in direct contact with the rotary pump stage.

2. A closed cycle rotary engine system according to claim 1, wherein the said rotary expander stage and rotary pump stage assembly are driven together by a common drive shaft rotating at a differential speed between the ranges of 1 to 1.1 and 1 to 1.5, a mitre gear and bevel gear set joining said common drive shaft to the two rotating elements of said rotary expander stage and rotary pump stage assembly.

3. A closed cycle rotary engine system, according to claim 1, wherein the said multiple tangential ports disposed within said rotary expander stage and rotary pump stage assembly are disposed nearly parallel in each stage and at near a 45° angle to the base line of said closed cycle rotary engine system.

4. A closed cycle rotary engine system according to claim 1, in which the said multiple condenser coils forming a fluid circuit include two large condensers exposed to moving ambient air, the said multiple air temperature splitters in close association with the said multiple condenser coils are driven by any suitable and convenient rotating power means.

5. A closed cycle rotary engine system according to claim 1, in which said multiple boiler coils and said multiple condenser coils are completely thermally insulated from each other by means of a shaped insulation member, thermal conduction means disposed between saln elongate fuel burners and said thermal regeneration means, thermal insulation means disposed completely over said thermal conduction means.

6. A closed cycle rotary engine system according to claim 1, in which said rotary expander stage and rotary pump stage of said rotary expander stage and rotary pump stage assembly are symmetrical and squarish in configuration, a lightweight support frame joins and rigidly supports said rotary expander stage and rotary pump stage.

* * * * *